United States Patent
Bakekolo et al.

(10) Patent No.: US 8,060,795 B2
(45) Date of Patent: Nov. 15, 2011

(54) SOLUTION FOR AUTOMATICALLY INCORPORATING DIAGNOSTIC DATA WITHIN SCREEN CAPTURE IMAGES

(75) Inventors: C. Patrick Bakekolo, Dublin (IE); Romeo Gamulescu, Dublin (IE); Kioso Mutambwir, Swords (IE); Simon P. O'Doherty, Ard-Na-Griene (IE); Brian O'Donovan, Castleknock (IE)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 12/121,594

(22) Filed: May 15, 2008

(65) Prior Publication Data

US 2009/0287962 A1    Nov. 19, 2009

(51) Int. Cl.
*G06F 11/00* (2006.01)
(52) U.S. Cl. .......................................................... 714/57
(58) Field of Classification Search .................. 714/27, 714/46, 57
See application file for complete search history.

(56) References Cited

U.S. PATENT DOCUMENTS

| | | | |
|---|---|---|---|
| 5,615,331 A | 3/1997 | Toorians et al. | |
| 5,926,638 A * | 7/1999 | Inoue .............. | 717/125 |
| 5,964,893 A | 10/1999 | Circello et al. | |
| 6,233,729 B1 | 5/2001 | Campara et al. | |
| 6,331,855 B1 * | 12/2001 | Schauser ......... | 345/502 |
| 6,573,915 B1 * | 6/2003 | Sivan et al. ..... | 715/781 |
| 6,587,995 B1 | 7/2003 | Duboc et al. | |
| 6,847,916 B1 | 1/2005 | Ying | |
| 6,961,924 B2 | 11/2005 | Bates et al. | |
| 7,212,624 B2 | 5/2007 | O'Connor et al. | |
| 7,251,808 B2 | 7/2007 | Bates et al. | |
| 7,290,245 B2 * | 10/2007 | Skjolsvold ...... | 717/125 |
| 7,310,777 B2 * | 12/2007 | Cirne ............... | 715/763 |
| 7,392,510 B1 * | 6/2008 | Treder et al. ..... | 717/128 |
| 2002/0000990 A1 * | 1/2002 | Schauser ......... | 345/504 |
| 2002/0087949 A1 | 7/2002 | Golender et al. | |
| 2002/0087952 A1 * | 7/2002 | Tabe et al. ....... | 717/124 |
| 2004/0057572 A1 | 3/2004 | O'Connor et al. | |
| 2004/0230954 A1 * | 11/2004 | Dandoy ............ | 717/124 |
| 2004/0254919 A1 | 12/2004 | Giuseppini | |
| 2005/0143137 A1 | 6/2005 | Matsunaga et al. | |
| 2005/0261879 A1 | 11/2005 | Shrivastava et al. | |
| 2006/0005066 A1 | 1/2006 | Brauneis, Jr. et al. | |
| 2006/0111888 A1 * | 5/2006 | Hiew et al. ...... | 703/22 |
| 2007/0005607 A1 * | 1/2007 | Fukuta et al. .... | 707/10 |
| 2007/0177761 A1 | 8/2007 | Levy | |
| 2008/0012987 A1 | 1/2008 | Hirata et al. | |
| 2008/0086701 A1 * | 4/2008 | Stokes et al. .... | 715/808 |
| 2008/0270612 A1 * | 10/2008 | Malakapalli et al. | 709/227 |
| 2009/0024948 A1 * | 1/2009 | Anka ................ | 715/771 |
| 2009/0172633 A1 * | 7/2009 | Tsyganskiy et al. | 717/104 |
| 2010/0058296 A1 * | 3/2010 | Nattinger ......... | 717/125 |

OTHER PUBLICATIONS

"How to Configure and Use Error Reporting in Windows XP", Microsoft Help and Support, May 7, 2007.

(Continued)

*Primary Examiner* — Bryce Bonzo
(74) *Attorney, Agent, or Firm* — Patents on Demand, P.A.; Brian K. Buchheit; Scott M. Garrett (57) ABSTRACT

The present invention can include an automated solution for incorporating diagnostic data within an image of a screen capture image. When a screen capture event is detected, a screen capture image can be generated. The software applications contained within the screen capture image can be identified. Diagnostic data pertaining to the identified software applications can be automatically collected and incorporated into the screen capture image file.

18 Claims, 4 Drawing Sheets

OTHER PUBLICATIONS

Gatte, T., "Microsoft Office Project: Please Send Us Error Reports", Microsoft Developer Network Blogs, Jan. 3, 2007.

Pratley, C., "Chris Pratley's Office Labs and OneNote Blog", Microsoft Corporation, 2008.

* cited by examiner

SOLUTION FOR AUTOMATICALLY INCORPORATING DIAGNOSTIC DATA WITHIN SCREEN CAPTURE IMAGES

BACKGROUND OF THE INVENTION

The present invention relates to the field of screen capture imaging, and, more particularly, to automatically incorporating diagnostic data within a screen capture image.

Diagnosing the cause of software application errors often requires a technical support agent to invest a considerable amount of time manually researching and/or compiling diagnostic data pertaining to the issue. In an attempt to assist the technical support agent with this task, a user will often provide a screen capture image of the error or issue. While the screen capture image provides a visual reference point for the technical support agent, the technical support agent must still conduct research into the underlying processes shown in the screen capture image.

Further, the technical support agent typically only has access to general diagnostic data of the software application, such as logs kept on an application server. The technical support agent is unable to access any diagnostic data that is specific to the user's client device. For example, a reference to a specific memory location on the client device remains unknown unless contained within a window of the software application present in the screen capture image.

SUMMARY OF THE INVENTION

A solution comprising a method, computer program product, and system for incorporating diagnostic data within an image of a screen capture. In the solution, a screen capture event can be detected. A screen capture image can be generated in response to the detection. The screen capture image can be stored in a screen capture image file. At least one software application can be identified that is contained in the screen capture image. Diagnostic data can be automatically collected for the software application from at least one computing device. The collected diagnostic data can be incorporated into the screen capture image file. The incorporating can utilize at least of a stenographic application, a graphical alteration application, and a relational companion file generation algorithm. The diagnostic data can include a reference to a diagnostic log, a memory reference, a list of related files, a source code file name, a database name, a database table name, a server name, and/or a stack trace reference.

In one embodiment, when the screen capture image file containing the incorporated diagnostic data can be provided to a technical support agent. The screen capture image can be presented in a display area of a viewing application. The incorporated diagnostic data can be visually rendered within the presented screen capture image. Each item of incorporated diagnostic data can be visually rendered with a spatial relationship to a corresponding area of the screen capture image within the display area, which provides a contextual meaning between the incorporated diagnostic data and the at least one software application contained in the screen capture image. The rendering can be performed in response to a user-positioning of a pointer mechanism within the display area of the viewing application in real-time for each item of incorporated diagnostic data.

In one embodiment, the screen capture image with the incorporated diagnostic data items can be rendered by a viewing application utilized by a technical support agent. The screen capture image can be an image of a screen of a user, where the user is communicating in real-time with the technical support agent.

When the solution is implemented within a computer program product, the computer program product can include a computer usable medium having computer usable program code embodied therewith. The computer usable program code can be configured to cause a machine to perform each of the actions of the solution in accordance with programmatic instructions of the computer usable program code.

When the solution is implemented within a system, the system can include a bus, a memory connected to the bus, and a processor. The memory can be configured to contain a set of instructions. The processor can be connected to the bus. The processor can be operable to execute the instructions of the memory, which results in the processor performing each of the actions of the solution.

BRIEF DESCRIPTION OF THE SEVERAL VIEWS OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The present invention discloses a solution that can automatically incorporate diagnostic data within an image of a screen capture. Such a screen capture image of an error encountered when using a software application can provide a support agent with pertinent information without requiring the additional research time. A diagnostic data tool can perform the screen capture and incorporate diagnostic data collected from various data pools that support the operation of the applications contained within the screen capture. A support agent can use a viewing application containing an incorporated data handler to view the screen capture image with its associated diagnostic data.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
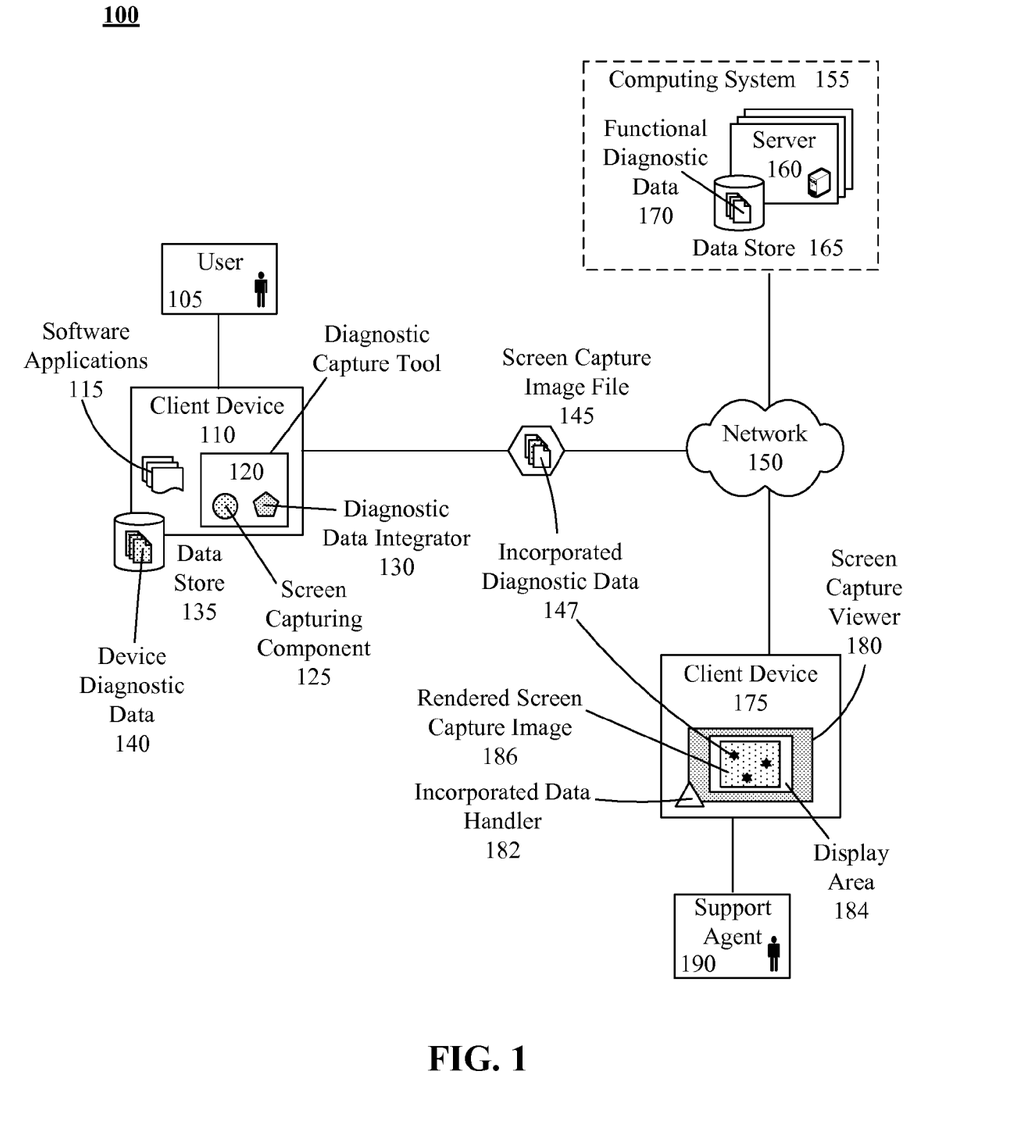
FIG. 1 is a schematic diagram illustrating a system that automatically incorporates diagnostic data within a screen capture in accordance with an embodiment of the inventive arrangements disclosed herein.

FIG. 1 is a schematic diagram illustrating a system 100 that automatically incorporates diagnostic data 147 within a screen capture 145 in accordance with embodiments of the inventive arrangements disclosed herein. In system 100, a user 105 can utilize a diagnostic capture tool 120 running on their client device 110 to create a screen capture image file 145 having diagnostic data 147 automatically incorporated within it.

The client device 110 can represent a variety of computing devices upon which various software applications 115 and the diagnostic capture tool 120 can operate. Examples of the client device 110 can include, but are not limited to, a personal computer, a laptop computer, a portable game console, a mobile phone, a multimedia device, and the like. Client device 110 can also be configured to communicate with a computing system 155 and the client device 175 of a support agent 190 over a network 150.

Software applications 115 can be running on the client device 110 when the user 105 executes a screen capture command within the diagnostic capture tool 120. The screen capturing component 125 of the diagnostic capture tool 120 can generate an electronic graphical representation of the software applications 115 being displayed by the client device 110.

The diagnostic data integrator 130 can analyze the screen capture created by the screen capturing component 125 to determine the diagnostic data 147 to incorporate into the screen capture image file 145. For example, four software applications 115 can be currently running on the client device 110, but only two of the software applications 115 may be shown in the screen capture.

The incorporated diagnostic data 147 can be obtained from a set of device diagnostic data 140 and/or a set of functional diagnostic data 170. The device diagnostic data 140 can be stored in a memory location local to the client device 110, such as a data store 135. The functional diagnostic data 170 can be obtained from data sources remotely located from the client device 110, such as data store 165.

The functional diagnostic data 170 can represent the operational data of the specific software application 115. For example, a trace log 170 of a database that is accessed by a database application 115. The data store 165 containing the functional diagnostic data 170 can be associated with a server 160. The server 160 can correspond to a variety of server types, such as a file server or database server that supports the function of the software application 115 on the client device 115. Further, multiple servers 160 can be involved with a single software application 115.

Once the applicable diagnostic data 147 has been compiled, the diagnostic data integrator 130 can incorporate the diagnostic data 147 into the screen capture image file 145. Incorporation of the diagnostic data 147 can be achieved via a variety of means, including, but not limited to, stenography, graphical overlay, and flyover windows. The incorporation of the diagnostic data 147 can also be influenced by user 105 selections and/or system performance issues. For example, a client device 110 with limited memory and/or processing power can be configured to generate a companion file containing the diagnostic data 147 while incorporating triggers to render the data 147 within the screen capture image.

The user 105 can convey the generated screen capture image file 145 with the corresponding incorporated diagnostic data 147 over the network 150 to a support agent 190. The support agent 190 can use a screen capture viewer 180 to access the screen capture image file 145.

The screen capture viewer 180 can represent a software application configured to visually present the screen capture image 186 and its associated diagnostic data 147 within a display area 184. The screen capture viewer 180 can include an incorporated data handler 182 for handling the display of the incorporated diagnostic data 147. The incorporated data handler 182 can be configured to extract the incorporated diagnostic data 147, when necessary, from the screen capture image file 145 and present the incorporated diagnostic data 147 within the rendered screen capture image 186.

It should be noted that the incorporated data handler 182 must be configured in conjunction with the diagnostic capture tool 120 in order to access the incorporated diagnostic data 147. That is, if the diagnostic capture tool 120 is configured to use stenography to incorporate the diagnostic data 147, then the incorporated data handler 182 must be configured to reverse the stenography process in order to decode the incorporated diagnostic data 147.

The incorporated data handler 182 can also be configured to automatically load or present the support agent 190 with the option to load files related to the incorporated diagnostic data 147. For example, a diagnostic log 170 corresponding to an item of diagnostic data 147 can be opened and set to the portion relevant to the diagnostic data 147.

In an alternate embodiment, the diagnostic capture tool 120 can be retrofitted to work with an existing screen capture application and/or mechanism. In this embodiment, the diagnostic capture tool 120 can be configured to incorporate the diagnostic data 147 into the screen capture image file 145 produced by the existing screen capture application.

As used herein, presented data stores, including stores 135 and 170, can be a physical or virtual storage space configured to store digital information. Data stores 135 and 170 can be physically implemented within any type of hardware including, but not limited to, a magnetic disk, an optical disk, a semiconductor memory, a digitally encoded plastic memory, a holographic memory, or any other recording medium. Each of the data stores 135 and 170 can be a stand-alone storage unit as well as a storage unit formed from a plurality of physical devices. Additionally, information can be stored within data store 135 and 170 in a variety of manners. For example, information can be stored within a database structure or can be stored within one or more files of a file storage system, where each file may or may not be indexed for information searching purposes. Further, data stores 135 and/or 170 can utilize one or more encryption mechanisms to protect stored information from unauthorized access.

Network 150 can include any hardware/software/and firmware necessary to convey data encoded within carrier waves. Data can be contained within analog or digital signals and conveyed though data or voice channels. Network 150 can include local components and data pathways necessary for communications to be exchanged among computing device components and between integrated device components and peripheral devices. Network 150 can also include network equipment, such as routers, data lines, hubs, and intermediary servers which together form a data network, such as the Internet. Network 150 can also include circuit-based communication components and mobile communication components, such as telephony switches, modems, cellular communication towers, and the like. Network 150 can include line based and/or wireless communication pathways.

Figure 2:
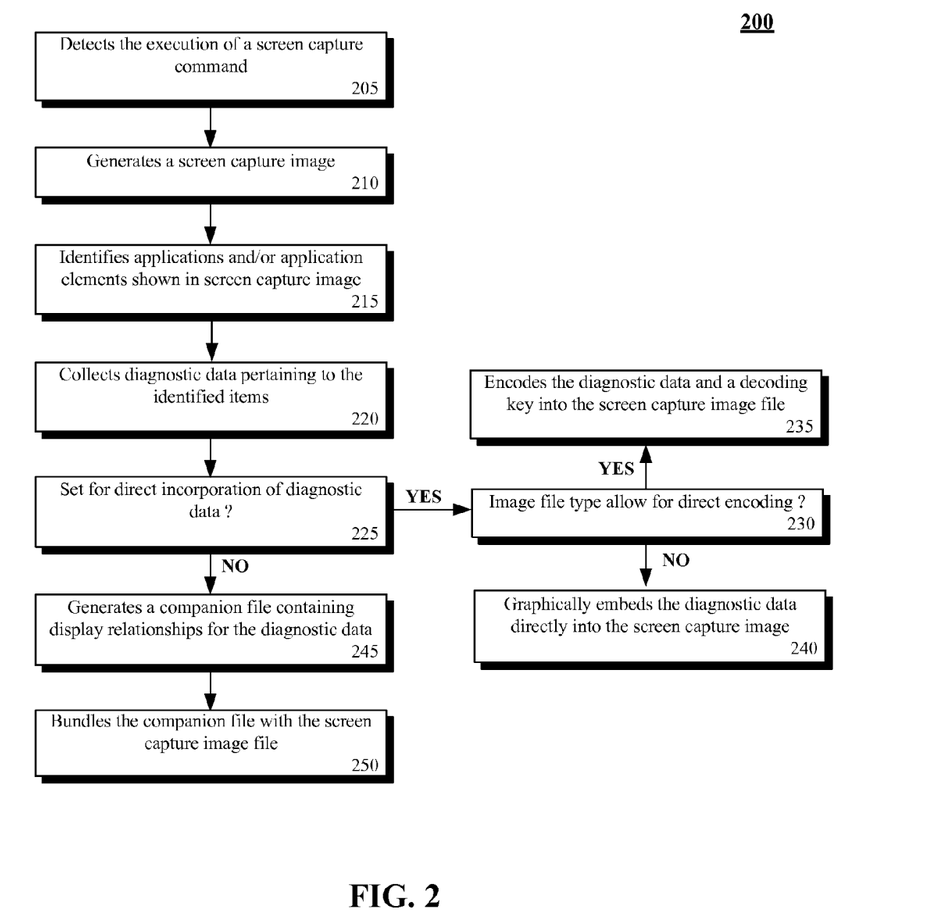
FIG. 2 is a flow chart of a method for automatically incorporating diagnostic data into a screen capture image in accordance with an embodiment of the inventive arrangements disclosed herein.

FIG. 2 is a flow chart of a method 200 for automatically incorporating diagnostic data into a screen capture image in accordance with an embodiment of the inventive arrangements disclosed herein. Method 200 can be performed in the context of system 100 or any other system supporting the incorporation of diagnostic data within a screen capture image. The steps of method 200 can be performed by a diagnostic capture tool.

Method 200 can begin in step 205 where the execution of a screen capture command can be detected. In step 210, a screen capture image can be generated. The applications and/or application elements shown in the screen capture image can be identified in step 215. In step 220, the diagnostic data pertaining to the identified items can be collected.

It can be determined if the diagnostic capture tool is set to directly incorporate the diagnostic data in step 225. When the diagnostic capture tool is not set to directly incorporate the diagnostic data, step 245 can execute where a companion file containing display relationships can be generated. In step 250, the companion file can be bundled with the screen capture image file.

When the diagnostic capture tool is set to directly incorporate the diagnostic data, step 230 can execute where it can be determined if the image file type of the screen capture image can allow for direct encoding of the diagnostic data. When direct encoding is allowed, the diagnostic data and a decoding key can be directly encoded into the screen capture image file in step 235.

When direct encoding is not allowed, step 240 can execute where the diagnostic data can be graphically embedded within the screen capture image. For example, text boxes containing the diagnostic data can be added to the screen capture image.

Figure 3:
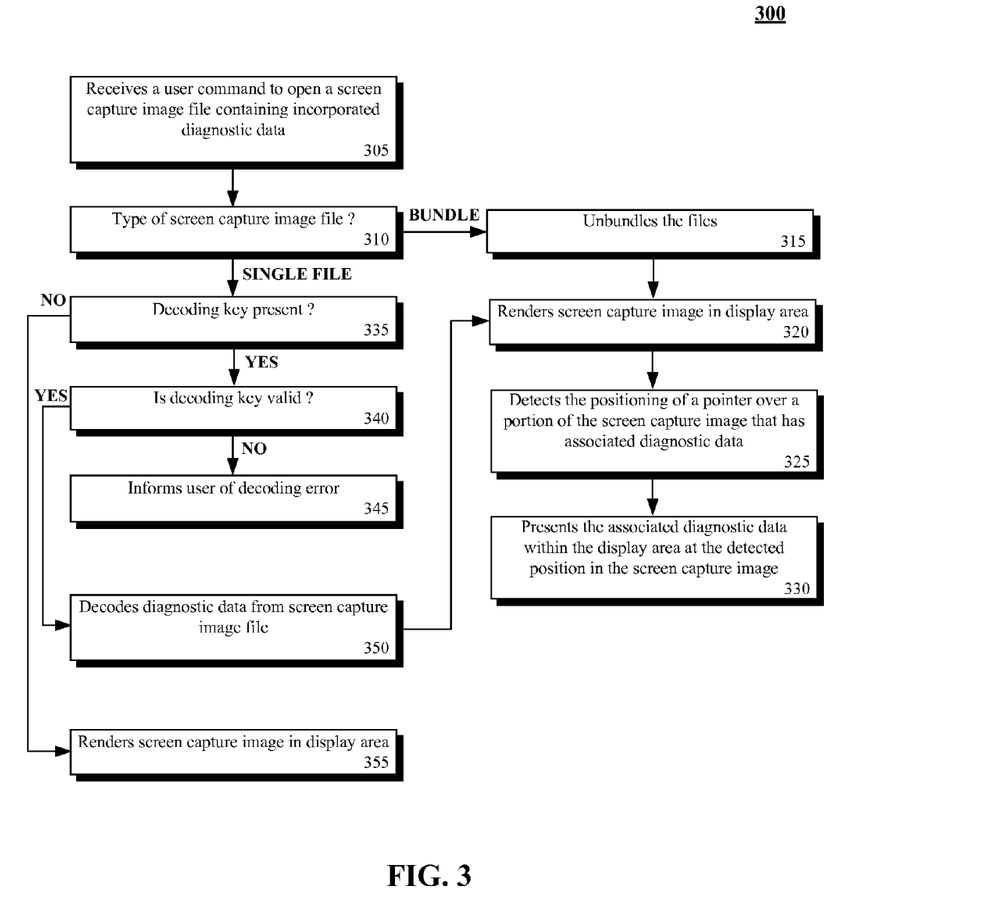
FIG. 3 is a flow chart of a method for presenting diagnostic data that was incorporated into a screen capture image in accordance with an embodiment of the inventive arrangements disclosed herein.

FIG. 3 is a flow chart of a method 300 for presenting diagnostic data that was incorporated into a screen capture image in accordance with an embodiment of the inventive arrangements disclosed herein. Method 300 can be performed in the context of system 100 or any other system supporting the incorporation of diagnostic data within a screen capture image. The steps of method 300 can be performed by a screen capture viewer configured to present diagnostic data incorporated into a screen capture image file.

Method 300 can begin in step 305 where a user command to open a screen capture image file containing incorporated diagnostic data can be received. In step 310, the type of screen capture image file can be determined. When it is determined that the file is a bundle, step 315 can execute where the files, such as the screen capture image file and a companion file, can be unbundled.

After the files have been unbundled, the screen capture image can be rendered in a display area in step 320. In step 325, the positioning of a pointer over a portion of the screen capture image having associated diagnostic data can be detected. The associated diagnostic data can be presented within the display area at the detect position in the screen capture image in step 330.

When it is determined that the screen capture image file is comprised of a single file, step 335 can execute where the presence of a decoding key can be determined. When a decoding key is present, the validity of the decoding key can be ascertained in step 340. When the decoding key is determined to be invalid, step 345 can execute informing the user of the decoding error.

When the decoding key is determined to be valid, the diagnostic data can be decoded from the screen capture image file in step 350. From step 350, flow can proceed to step 320 for the rendering of the screen capture image and diagnostic data.

When a decoding key is not present in the screen capture image file, step 355 can execute where the screen capture image can be rendered in the display area. It should be noted that the absence of a decoding key signifies that the diagnostic data has been graphically incorporated into the actual screen capture image. Therefore, the rendering of the screen capture image also renders the incorporated diagnostic data.

Figure 4:
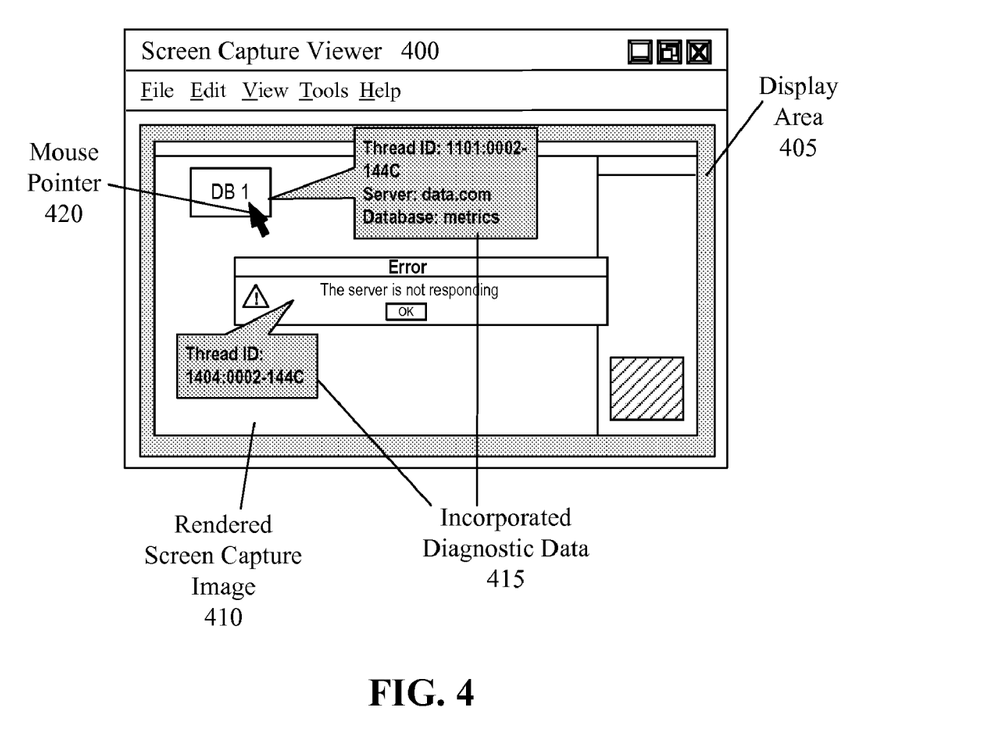
FIG. 4 is a graphical user interface (GUI) of a screen capture viewer that presents diagnostic data incorporated within a screen capture in accordance with embodiments of the inventive arrangements disclosed herein.

FIG. 4 is a graphical user interface (GUI) of a screen capture viewer 400 that presents diagnostic data 415 incorporated within a screen capture 410 in accordance with embodiments of the inventive arrangements disclosed herein. The screen capture viewer 400 can execute method 300.

The screen capture viewer 400 can be a software application configured to visually present a screen capture image 410 containing incorporated diagnostic data 415 within a display area 405. The rendering of the incorporated diagnostic data 415 can be performed dynamically based on the positioning of the mouse pointer 420. For example, the incorporated diagnostic data 415 can be presented in a flyover window when the mouse pointer 420 is positioned over a corresponding area of the screen capture image 410.

Alternately, the incorporated diagnostic data 415 can have been graphically embedded within the screen capture image 410, requiring the screen capture viewer 400 to only render the screen capture image 410.

The diagrams in FIGS. 1-4 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An automated method for incorporating diagnostic data within an image of a screen capture comprising:
   detecting a screen capture event;
   generating a screen capture image in response to the detecting step, wherein the screen capture image is stored in a screen capture image file;
   identifying at least one software application contained in the screen capture image;
   automatically collecting diagnostic data for the at least one software application from at least one computing device; and
   incorporating the collected diagnostic data into the screen capture image file, wherein the incorporating step utilizes at least of a stenographic application, a graphical alteration application, and a relational companion file generation algorithm, and wherein the diagnostic data comprises at least one of a reference to a diagnostic log, a memory reference, a list of related files, a source code file name, a database name, a database table name, a server name, and a stack trace reference, wherein at least a portion of the collected diagnostic data is collected from a plurality of computing devices at least one of which is remotely located from a client device upon which the at least one software application runs.

2. The method of claim 1, wherein when the screen capture image file containing the incorporated diagnostic data is provided to a technical support agent, said method further comprising:

presenting the screen capture image in a display area of a viewing application; and visually rendering the incorporated diagnostic data within the presented screen capture image, wherein each item of incorporated diagnostic data is visually rendered with a spatial relationship to a corresponding area of the screen capture image within the display area, whereby providing a contextual meaning between the incorporated diagnostic data and the at least one software application contained in the screen capture image, wherein the rendering step is performed in response to a user-positioning of a pointer mechanism within the display area of the viewing application in real-time for each item of incorporated diagnostic data.

3. The method of claim 1, wherein the screen capture image with the incorporated plurality of diagnostic data items is rendered by a viewing application utilized by a technical support agent, and wherein the screen capture image is an image of a screen of a user, wherein said user is communicating in real-time with the technical support agent.

4. The method of claim 1, said incorporating comprising: incorporating the collected diagnostic data into the screen capture image file utilizing a stenographic application.

5. The method of claim 1, said incorporating comprising: incorporating the collected diagnostic data into the screen capture image file utilizing a graphic alternation application.

6. The method of claim 1, wherein the screen capture image shows a plurality of different software applications running on a client device for which the screen capture event was detected, wherein the at least one software application of the identifying and collecting steps comprises the plurality of different software applications running on the client device.

7. The method of claim 1, wherein the screen capture image shows a plurality of different applications running on a client device, wherein the shown plurality of different applications is less than a number of applications running on the client device, and wherein the diagnostic data is collected for only those ones of the different applications shown in the screen capture image.

8. The method of claim 1, wherein the screen capture image is an image of a client device running said at least one software application, wherein the collecting of the collected diagnostic data comprises collecting functional diagnostic data from at least one remotely located server that supports a function of the at least one software application on the client device, wherein the incorporated collected diagnostic data comprises functional diagnostic data from the at least one remotely located server.

9. The method of claim 1, further comprising:
determining an image file type of the screen capture image;
determining whether the image file type allows for direct encoding of the collected diagnostic data; and when direct encoding is allowed for the image file type, directly encoding the diagnostic data into the screen capture image file.

10. The method of claim 1, further comprising:
determining an error in the software application and responsively triggering the screen capture event in order to ultimately provide a support agent with pertinent information for the error without requiring additional research time, wherein the pertinent information comprises the screen image file and the incorporated diagnostic data.

11. The method of claim 1, further comprising:
Receiving a user executed screen capture command from within a diagnostic capture tool; and
Responsive to the user executed screen capture command, firing the screen capture event.

12. The method of claim 1, wherein the screen capture image is an electronic graphical representation of the at least one software application being displayed on a client device for which the screen capture event was initiated.

13. The method of claim 1, wherein the incorporating of the collected diagnostic data comprises:
incorporating the diagnostic data using at least one flyover window.

14. The method of claim 1, wherein the incorporating of the collected diagnostic data comprises:
incorporating the diagnostic data using at least one graphical overlay.

15. A computer program product for incorporating diagnostic data within an image of a screen capture comprising:

a computer usable medium having computer usable program code embodied therewith, the computer usable program code comprising:

computer usable program code configured to detect a screen capture event;

computer usable program code configured to generate a screen capture image in response to detecting the screen capture event, wherein the screen capture image is stored in a screen capture image file, wherein the screen capture image shows a plurality of different software applications running on a client device for which the screen capture event was detected;

computer usable program code configured to identify at least one software application contained in the screen capture image;

computer usable program code configured to automatically collect diagnostic data for the at least one software application from at least one computing device, wherein the at least one software application of the identifying and collecting steps comprises the plurality of different software applications running on the client device; and computer usable program code configured to incorporate the collected diagnostic data into the screen capture image file, wherein the incorporating of the data utilizes at least of a stenographic application, a graphical alteration application, and a relational companion file generation algorithm, and wherein the diagnostic data comprises at least one of a reference to a diagnostic log, a memory reference, a list of related files, a source code file name, a database name, a database table name, a server name, and a stack trace reference.

16. The computer program product of claim 15, said computer program product further comprising:

computer usable program code configured to present the screen capture image in a display area of a viewing application; and     computer usable program code configured to visually render the incorporated diagnostic data within the presented screen capture image, wherein each item of incorporated diagnostic data is visually rendered with a spatial relationship to a corresponding area of the screen capture image within the display area, whereby providing a contextual meaning between the incorporated diagnostic data and the at least one software application contained in the screen capture image, wherein the rendering step is performed in response to a user-positioning of a pointer mechanism within the display area of the viewing application in real-time for each item of incorporated diagnostic data.

17. The computer program product of claim 15, wherein the screen capture image with the incorporated plurality of diagnostic data items is rendered by a viewing application utilized by a technical support agent, and wherein the screen capture image is an image of a screen of a user, wherein said user is communicating in real-time with the technical support agent.

18. An automated method for incorporating diagnostic data within an image of a screen capture comprising:

determining an error in the software application;

responsive to the error, triggering a screen capture event;

generating a screen capture image in response to the detecting step, wherein the screen capture image is stored in a screen capture image file;

identifying at least one software application contained in the screen capture image;

automatically collecting diagnostic data for the at least one software application from at least one computing device;

incorporating the collected diagnostic data into the screen capture image file, wherein the incorporating step utilizes at least of a stenographic application, a graphical alteration application, and a relational companion file generation algorithm, and wherein the diagnostic data comprises at least one of a reference to a diagnostic log, a memory reference, a list of related files, a source code file name, a database name, a database table name, a server name, and a stack trace reference; and     providing a support agent with pertinent information for the error without requiring additional research time, wherein the pertinent information comprises the screen image file and the incorporated diagnostic data.

\* \* \* \* \*